Patented Apr. 13, 1926.

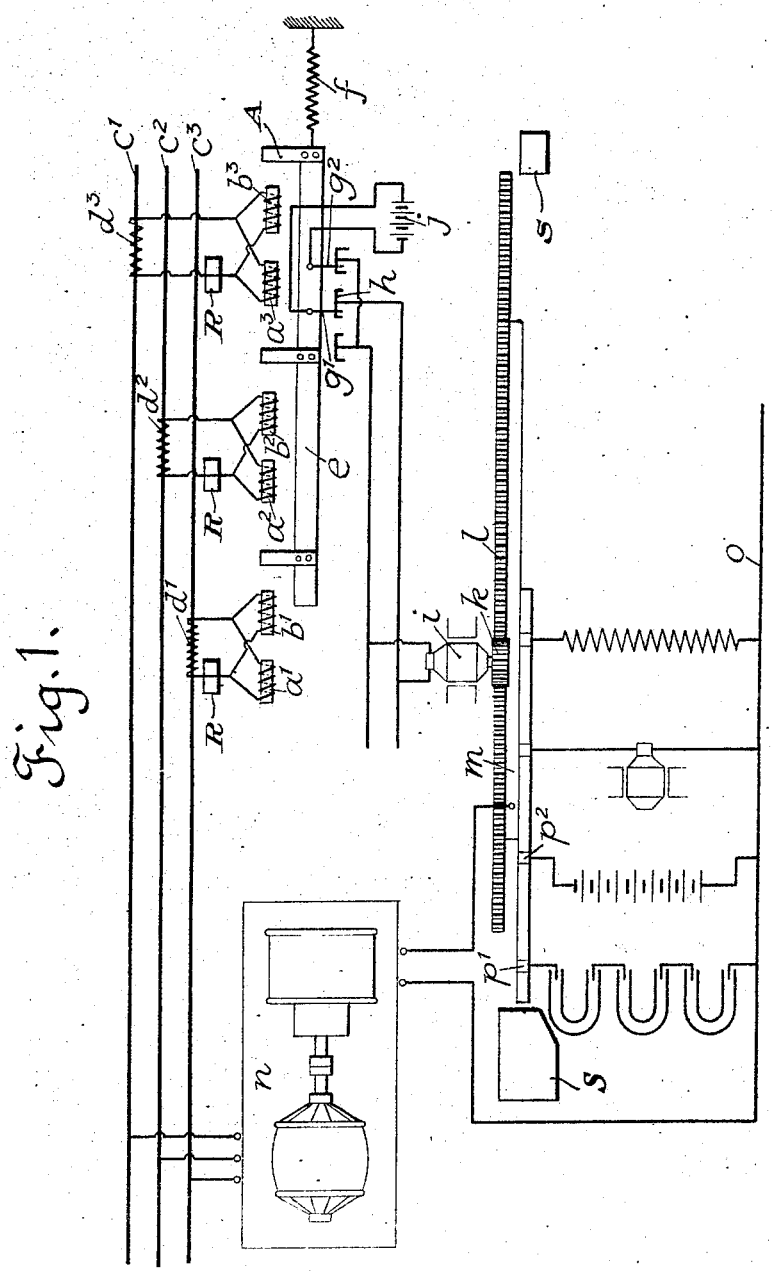

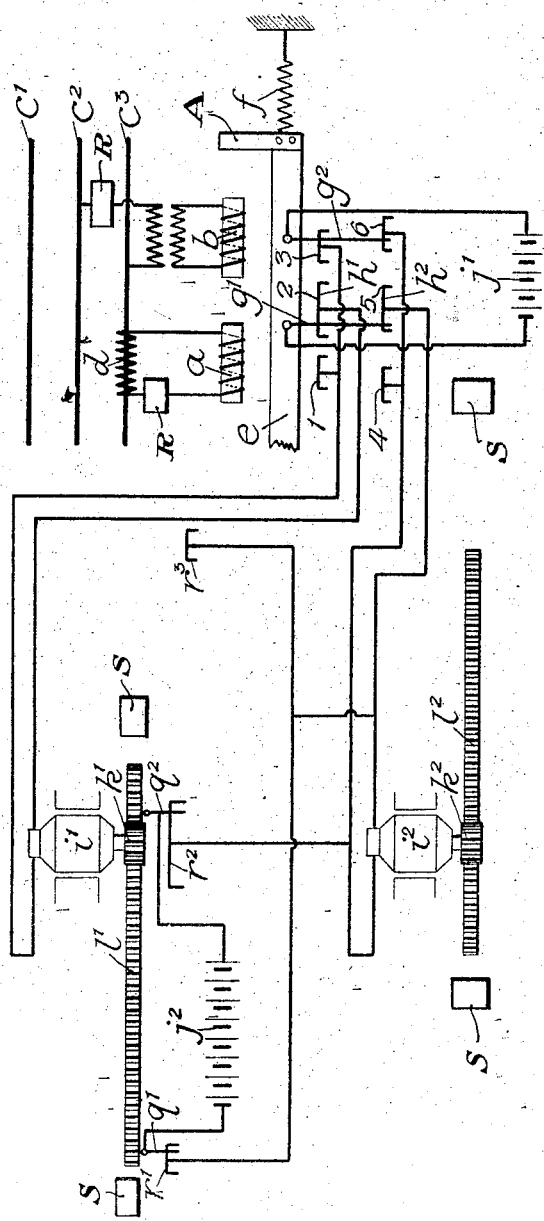

1,580,386

UNITED STATES PATENT OFFICE.

HITOSI SIIO, OF NAGOYA, JAPAN.

APPARATUS FOR UTILIZATION OF EXCESSIVE POWER AT ELECTRIC SOURCES.

Application filed June 12, 1923. Serial No. 644,846.

*To all whom it may concern:*

Be it known that I, HITOSI SIIO, a subject of the Emperor of Japan, residing at Nagoya, Aiti-ken, Japan, have invented certain new and useful Improvements in Apparatus for Utilization of Excessive Power at Electric Sources; and I do hereby declare the following to be a full, clear, and exact description of the invention, such as will enable others skilled in the art to which it appertains to make and use the same.

The present invention relates to an apparatus for utilization of excessive power generated by a source of electricity which is characterized by the fact that the auxiliary load is automatically controlled by means of an electric motor or motors connected with a relay which is adapted to directly regulate the amount of auxiliary load in accordance with the variation of the main load.

The object of this invention is to utilize excessive power at substations and power stations, and to equalize the load on electric transmission and distribution systems subject to large load fluctuations.

In order that the invention may be thoroughly understood, a more detailed description will be given and references will be made to the accompanying drawings, in which:—

Figure 1 shows a diagrammatic view of an example of the apparatus according to the invention, and, Figure 2 shows a similar view of a modified device for automatically controlling the auxiliary load.

The relay comprises three sets of electro-magnets $a^1$, $b^1$; $a^2$, $b^2$ and $a^3$, $b^3$, which are respectively connected with the main lines $c^3$, $c^2$ and $c^1$ of a three-phase distribution system through current transformers $d^1$, $d^2$ and $d^3$, and adapted to directly co-operate in accordance with the increase of the load current. Each electro-magnet circuit may include an ordinary rectifier R so that an ordinary direct current magnet may be utilized. The armatures A of these electromagnets are in contact with their magnets when the load is heavy. These armatures are rigidly secured to a bar $e$, made of insulating material. This insulating bar $e$ is pulled to the right by a tension spring $f$ against the attraction of the said electromagnets. The insulating bar $e$ carries two movable contact pieces $g^1$ and $g^2$ of a switch $h$, with which a direct-current motor $i$ is connected, the said contact pieces being in circuit with a battery $j$. If the contact pieces $g^1$ and $g^2$ engage with the switch $h$, as shown in Fig. 1, then the motor $i$ will rotate in a clock-wise direction, for instance, under the influence of the electric current supplied by the battery $j$. To the motor shaft is keyed a pinion $k$, which gears with a rack $l$ carrying a conductor $m$, with which one of the leads from a motor-generator set $n$ is connected, the other lead being connected with a bus bar $o$. The conductor $m$ serves to make and break circuits of the auxiliary loads for instance, an electrolytic apparatus, a battery, a direct-current motor, a heating apparatus, etc., having contacts $p^1$, $p^2$ etc., these contacts being adapted to be slidably engaged by conductor $m$. These auxiliary loads are respectively inserted between the said contacts and the bus bar when the movement of rack $l$ has closed the circuits of all the auxiliary loads. The movement of rack $l$ is limited by stops S.

The operation of my device is as follows:—

If the main load decreases, the attractive force of each of the electromagnets $a$, $b$ respectively decreases in proportion to the decrease of the main load. Then the spring $f$ may pull the insulating bar $e$ to the right against the attraction of the said electromagnets and causes the contact pieces $g^1$ and $g^2$ to touch the switch $h$, as shown in Fig. 1. Then the motor $i$ begins to revolve the pinion $k$ in the clock-wise direction, and consequently, to move the rack $l$ to the left, increasing the auxiliary load, so that the excessive power in the source of current is effectively utilized and the load in the mains is equalized favourably. On the contrary, if the main load increases, the rack $l$ is moved to the right and the auxiliary load will be decreased. The movement of rack $l$ is limited by stops S so that the rack $l$ is held either in the position in which no auxiliary load is in circuit, or it is held in the position in which the full auxiliary load is in circuit.

Fig. 2 shows a diagrammatic view of a modified apparatus according to the invention, the representation of the auxiliary load being omitted. In the drawing, there are two switches $h^1$ and $h^2$, having movable common contact pieces $g^1$ and $q^2$, and two direct-current motors $i^1$ and $i^2$, which serve to respectively control each auxiliary load. These auxiliary loads are not shown in Fig. 2 as their location, etc., can be readily understood from Fig. 1.

A rack $l^1$, operated by gear $k^1$ of the first motor $i^1$, carries movable contact pieces $q^1$ and $q^2$, connected to the terminals of a battery $j^2$. The said battery serves to operate the second motor $i^2$, even if said second motor $i^2$ is not connected to a second battery $j'$, when the rack $l^1$ is at the left end of its path of movement or the right end and the movable contact pieces $q^1$ and $q^2$ engage with fixed contact pieces $r^1$ and $r^2$, or with $r^2$ and $r^3$. The movements of rack $l^1$ and rack $l^2$ is limited by stops S. The second auxiliary load to be controlled by the second motor $i^2$ by means of rack $l^2$ actuated by pinion $k^2$ is preferably larger than the first one which is controlled by the first motor $i^1$.

If the main load decreases substantially, the movable contacts $g'$ and $q^2$ will move until they respectively touch the terminals 2, 5 and 3, 6. The battery $j'$ will then simultaneously actuate motors $i'$ and $i^2$. If the main load decreases slightly, the movable contacts $g'$ and $q^2$ will be moved a shorter distance to the right and away from the terminals 1, 4 until contact $g'$ touches switch terminals 2, 5, while contact $g^2$ will touch switch terminal 3 but will not touch switch terminal 6. This is because the distance between terminals 2, 3 is less than the distance between terminals 5, 6. Then battery $j'$ will be operated to actuate motor $i'$ alone and motor $i'$ will operate rack $l'$ so as to close the circuit between battery $j^2$ and motor $i^2$, whereby said motor $i^2$ will be operated. When armature A (shown in Fig. 2) contacts with the magnet core, the movable contact $g'$ touches switch contacts 1, 4, and movable contact $q^2$ touches switch contacts 2, 5, thus causing motor $i'$ to revolve in the opposite direction to cause the actuation of members $q'$ and $q^2$, whereby motor $i^2$ is caused to revolve in the opposite direction. As seen in Fig. 2 the motor $i^2$ is connected to terminals $r'$ and $r^2$, and the movable switch members $q'$ and $q^2$ may be moved by the rack $l'$ so that they move into and out of contact with the motor terminals $r'$ and $r^2$. The movement of each said rack $l'$ and $l^2$ causes an auxiliary load to take up the surplus power, as previously shown in connection with Fig. 1.

The controlling motors $i^1$ and $i^2$ may be caused to stop by using suitable means, for instance, a battery which serves to compensate the electromotive force of the battery $j^1$ or the batteries $j^1$ and $j^2$. Moreover, if necessary, three or more controlling motors may be used in similar manners.

It is of course to be understood that the present apparatus described above may be modified in various manners without departing from the scope of this invention.

Having thus described my invention, what I claim as new and desire to secure by Letters Patent is:—

1. An apparatus for the utilization of excess power from a source of electric current comprising movable electro-magnetic means, means adapted to energize said electro-magnetic means from the current flowing from the said source, an auxiliary motor having a source of electric power therefor, switch means operated by the said electro-magnetic control means and adapted to control the movement of the said auxiliary motor in opposite directions, auxiliary load means, and switch means operated by the movement of the said auxiliary motor to connect the said auxiliary load means to the said source of power when the said auxiliary motor is operated in one direction, and to disconnect the said auxiliary load means from the said source of power when it is operated in the opposite direction.

2. In combination a source of electric power, a transmitting line connected thereto, a transformer connected to the said transmitting line, electromagnetic means energized by the current from the said transformer, an auxiliary motor having a source of electric power, switch means operated in one direction by the said electromagnetic means to cause the said motor to be revolved in one direction and to cause the said auxiliary motor to be revolved in the opposite direction when the said switch means move in the opposite direction, and switch means operated by the auxiliary motor and adapted to connect auxiliary load means to the said source of current when the said auxiliary motor is moved in one direction and to disconnect the said auxiliary load means from the said source of power when the said auxiliary motor is revolved in the opposite direction.

3. An apparatus for the utilization of excess power from a source of current, comprising a first motor $i'$ and a second motor $i^2$, each said motor being adapted to connect an auxiliary load means to said source of current when it is actuated in one direction and to disconnect said auxiliary load means when said motor is operated in the opposite direction, movable electromagnetic means, means adapted to energize said electromagnetic means from the current flowing from said source, a first switch terminal 2 connected to one of the terminals of the first motor $i'$, a pair of second switch terminals 1 and 3 connected to each other and to the other terminal of the first motor $i'$, a third switch terminal 5 connected to one of the terminals of the second motor $i^2$, a pair of fourth switch terminals 4 and 6 connected to each other and to the other terminal of the second motor $i^2$, movable switch members $g^1$ and $g^2$ a first auxiliary source of current $j'$ having its terminals connected to the movable switch members $g'$ and $g^2$, the said movable switch members $g'$ and $g^2$ being connected to a rod having armature means operable by said electromagnetic means so that the movable switch member $g'$ can simultaneously contact with one of the pair of second switch terminals 1 and one of the pair of fourth switch terminals 4, or the said movable switch member $g'$ can simultaneously contact with the first switch terminal 2 and the third switch terminal 5, the switch member $g^2$ being adapted to contact with both the first switch terminal 2 and the third switch terminal 5 when the switch member $g'$ contacts with one of the pair of second switch terminals 1 and one of the pair of fourth switch terminals 4, the said switch member $g^2$ being also adapted to simultaneously contact with one of the pair of second terminals 3 and one of the pair of fourth switch terminals 6 or to contact with one of the pair of second terminals 3 alone when said switch member $g'$ contacts with the first switch terminal 2 and the third switch terminal 5, a first auxiliary source of electric current $j'$ having its terminals connected to the switch members $g'$ and $g^2$, movable switch members $q'$ and $q^2$, a toothed member connected to said switch members $q'$ and $q^2$, a gear mounted on the shaft of the first motor $i'$ and in engagement with said toothed member so that said motor $i'$ can operate said toothed member in opposite directions, a second auxiliary source of electric current $j^2$ having its terminals connected to movable switch members $q'$ and $q^2$, terminal members $r'$ and $r^2$ the terminals of the second motor $i^2$ being connected to said terminal members $r'$ and $r^2$, the said movable switch members $q'$ and $q^2$ being adapted to be moved into and out of contact with the terminal members $r'$ and $r^2$, the terminal member $r'$ being connected to the third switch terminal 5, and the terminal member $r^2$ being connected to one of the pair of fourth switch terminals 6.

4. An apparatus for the utilization of excess power from a source of electric current, comprising a first auxiliary source of current, a second auxiliary source of current, a first motor and a second motor, movable electromagnetic control means adapted to be moved into a plurality of positions, means adapted to energize said electromagnetic means from the change of current flowing from said source, switch means operated by said electro-magnetic means and adapted to connected both said motors to the first auxiliary source of current when said electromagnetic means are in one position and to reverse the connections of both said motors to said first auxiliary source when said electromagnetic means are in a second position and to connect the first motor alone to said first auxiliary source when said electromagnetic means are in a third position, and second switch means adapted to be operated by said first motor to connect said second motor to said second auxiliary source.

In testimony whereof I affix my signature.

HITOSI SIIO.